Figure 1:
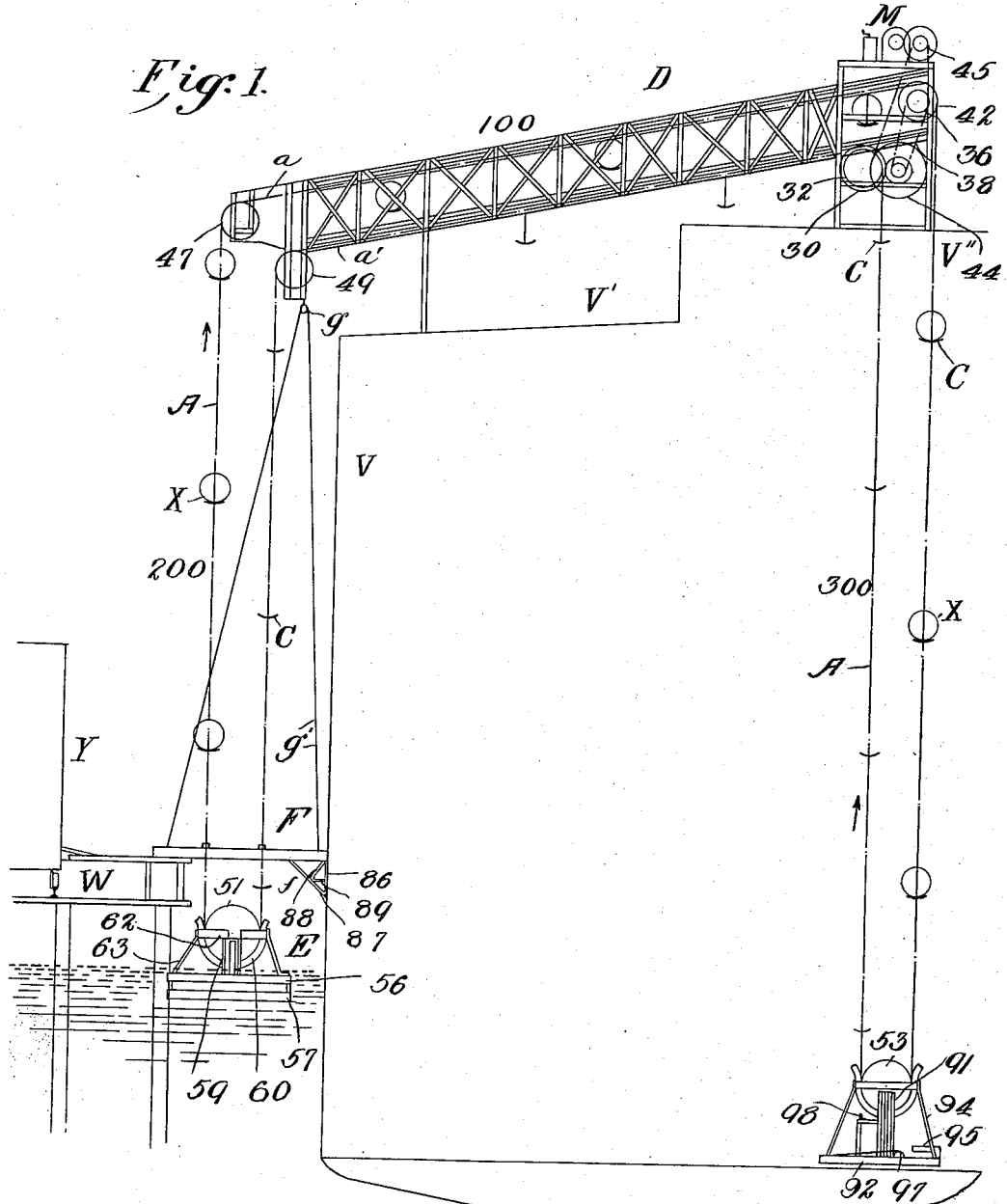

B. H. ALVEY.
SHIP LOADER OR UNLOADER.
APPLICATION FILED OCT. 14, 1910.

1,156,653.  Patented Oct. 12, 1915.
11 SHEETS—SHEET 5.

B. H. ALVEY.
SHIP LOADER OR UNLOADER.
APPLICATION FILED OCT. 14, 1910.

1,156,653.

Patented Oct. 12, 1915.
11 SHEETS—SHEET 6.

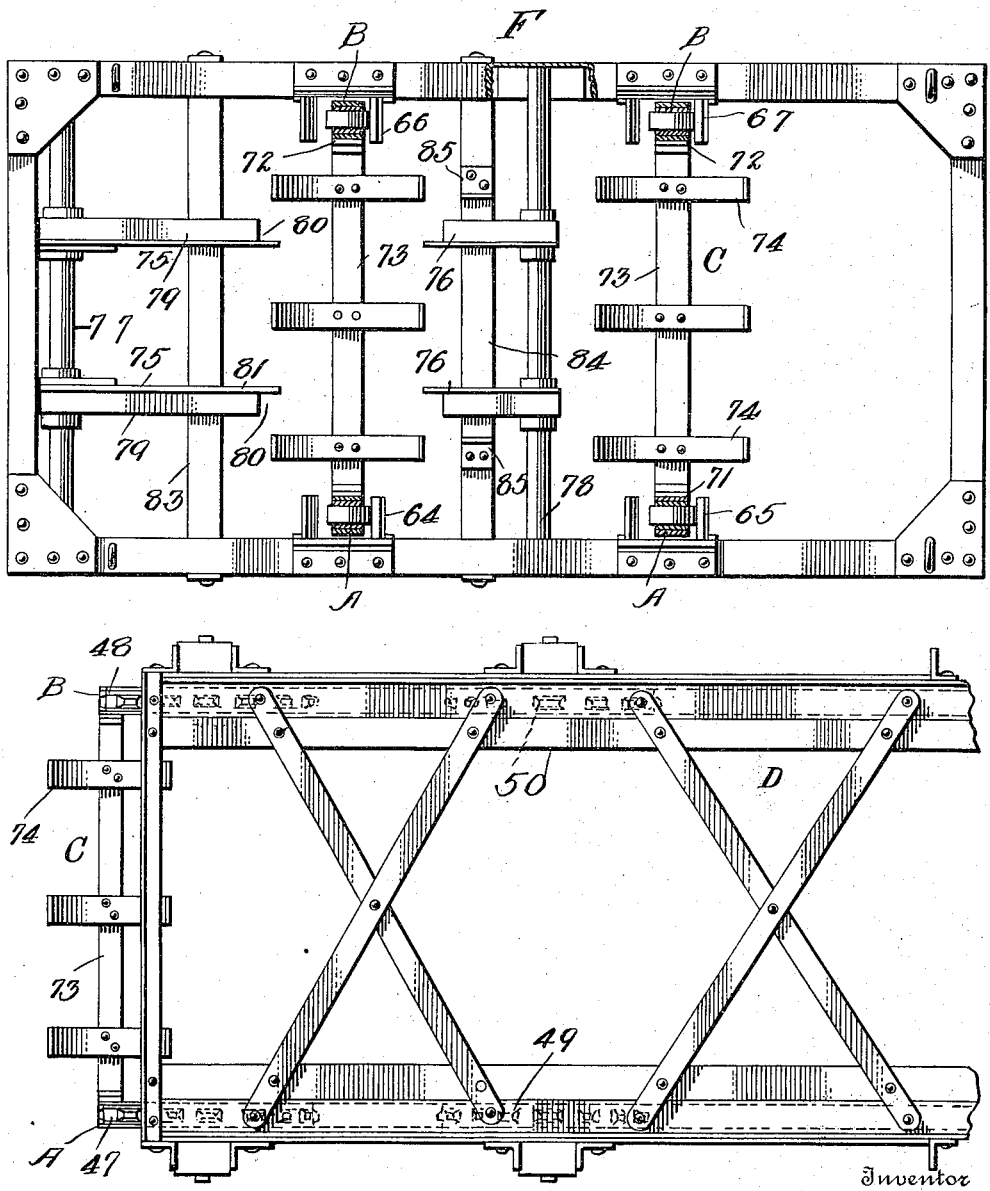

B. H. ALVEY.
SHIP LOADER OR UNLOADER.
APPLICATION FILED OCT. 14, 1910.

1,156,653.

Patented Oct. 12, 1915.
11 SHEETS—SHEET 8.

B. H. ALVEY.
SHIP LOADER OR UNLOADER.
APPLICATION FILED OCT. 14, 1910.

1,156,653.

Patented Oct. 12, 1915.
11 SHEETS—SHEET 9.

Witnesses
Jos. F. Collins
A. Stockman

Inventor
Benjamin H. Alvey
By C. J. Stockman
Attorney

B. H. ALVEY.
SHIP LOADER OR UNLOADER.
APPLICATION FILED OCT. 14, 1910.

1,156,653.

Patented Oct. 12, 1915.
11 SHEETS—SHEET 10.

Witnesses
Jo. H. Collins
A. Stockman

Inventor
Benjamin H. Alvey
By C. J. Stockman
Attorney

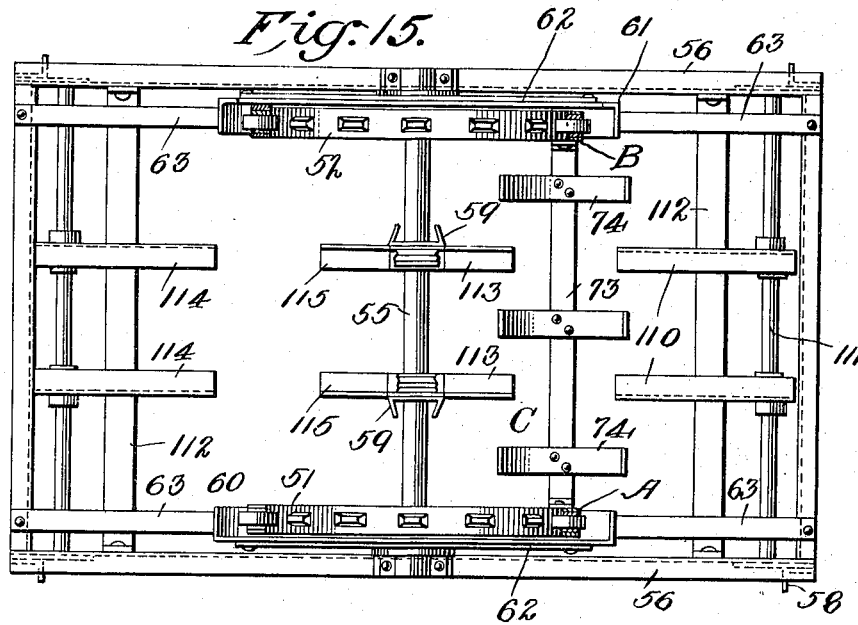

UNITED STATES PATENT OFFICE.

BENJAMIN H. ALVEY, OF ELIZABETHTOWN, KENTUCKY.

SHIP LOADER OR UNLOADER.

1,156,653.   Specification of Letters Patent.   Patented Oct. 12, 1915.

Application filed October 14, 1910. Serial No. 587,098.

*To all whom it may concern:*

Be it known that I, BENJAMIN H. ALVEY, a citizen of the United States, residing at Elizabethtown, in the county of Hardin and State of Kentucky, have invented new and useful Improvements in Ship Loaders or Unloaders, of which the following is a specification.

This invention relates to a mechanism for loading and unloading ships, and consists in certain peculiarities in the construction of parts and in certain novel combinations and arrangements of elements substantially as hereinafter described and particularly pointed out in the subjoined claims.

The ultimate object of the invention is to provide a conveying system for loading and unloading vessels, which will be most simple and practical in its construction and will accomplish its purpose in a most satisfactory manner and with a minimum of expense for manual attendance or work.

Among the other purposes of the invention, are: First: the provision of a means for loading and unloading ships which comprises receiving or loading and discharging or unloading platforms and a traveling carrier, so correlated that they will operate together and to perform their respective functions regardless of the various relative movements of the ship and the dock, barge, lighter or the like to or from which the ship is being unloaded or loaded, which movements are due, for example, to tides, waves and the changing of the weight of the load. Second: To provide means of a most desirable form for delivering the packages to the receiving section of the conveyer. Third: To provide means of most desirable form for taking the packages from the discharging section of the conveyer. Fourth: To provide a most efficient driving mechanism for the carriers.

These and other important several purposes of the invention, which will hereinafter fully appear, are well accomplished by the construction illustrated in the accompanying drawings to exemplify what is now regarded to be the best embodiment thereof, but to the details of which the invention, considered in its broader aspects, is not restricted, as many changes may be made therein and the important features of the invention embodied in many apparently widely different means without departing from the spirit of the invention or the scope of the subjoined claims.

Figure 2:
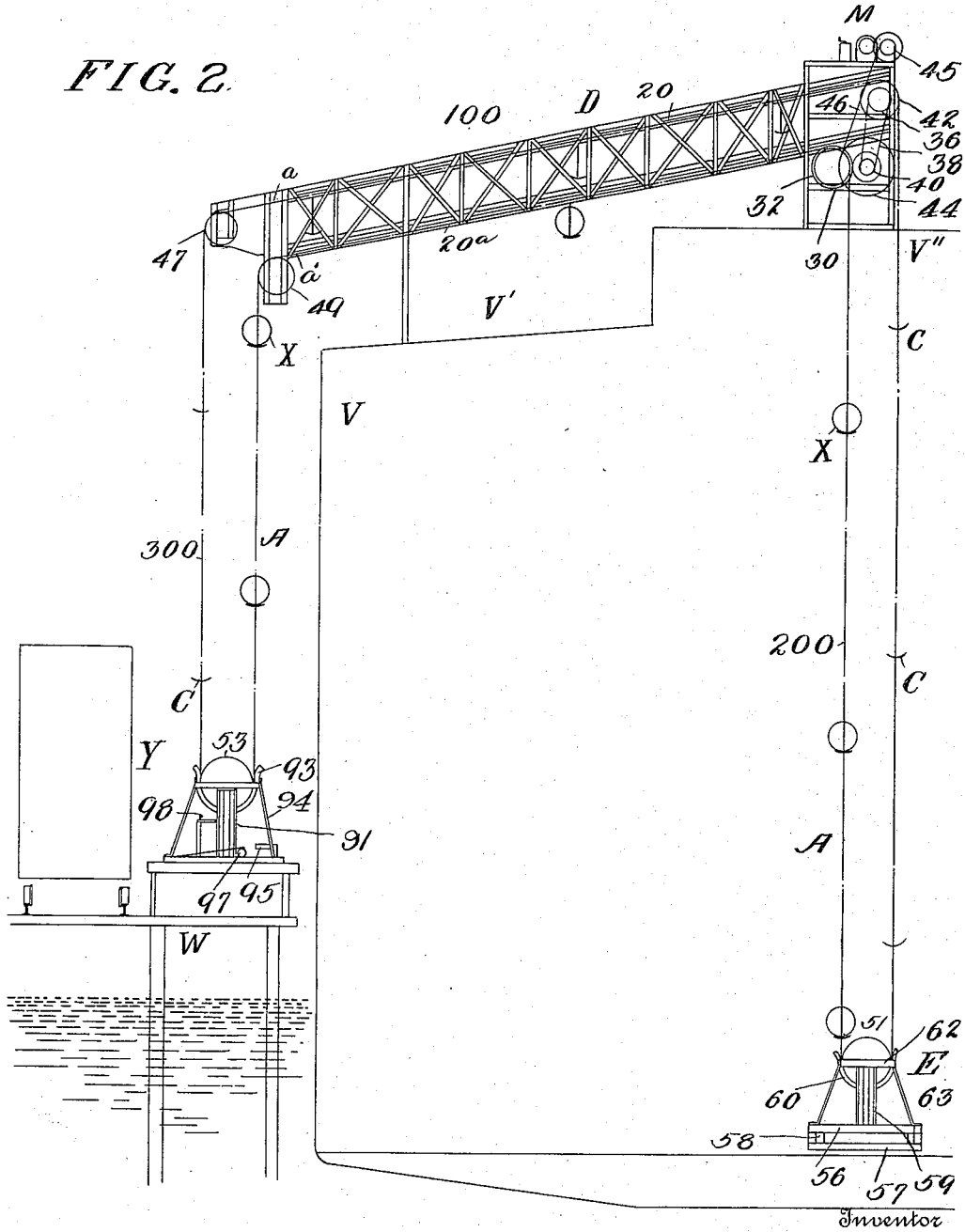
Figure 3:
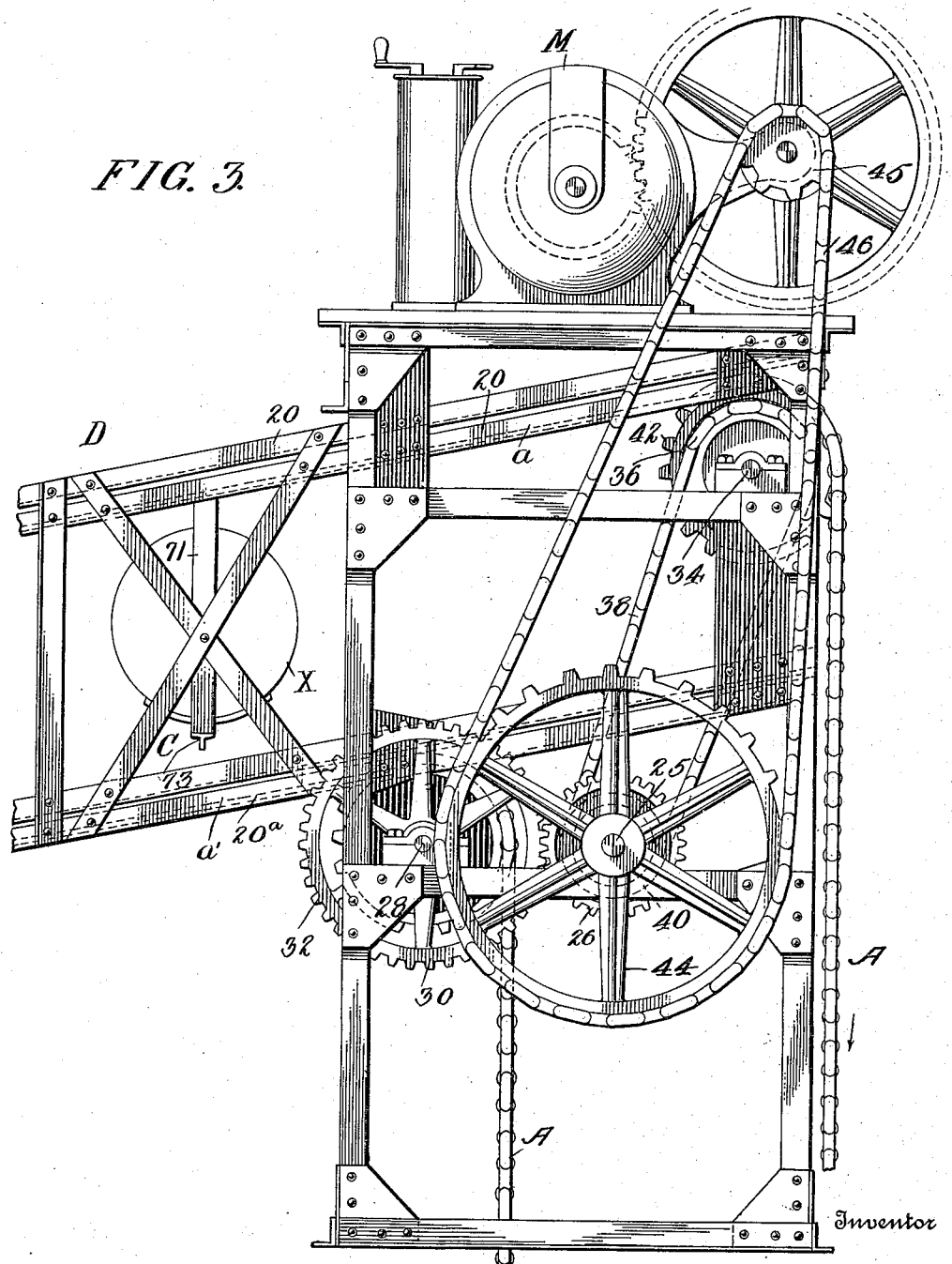
Figure 4:
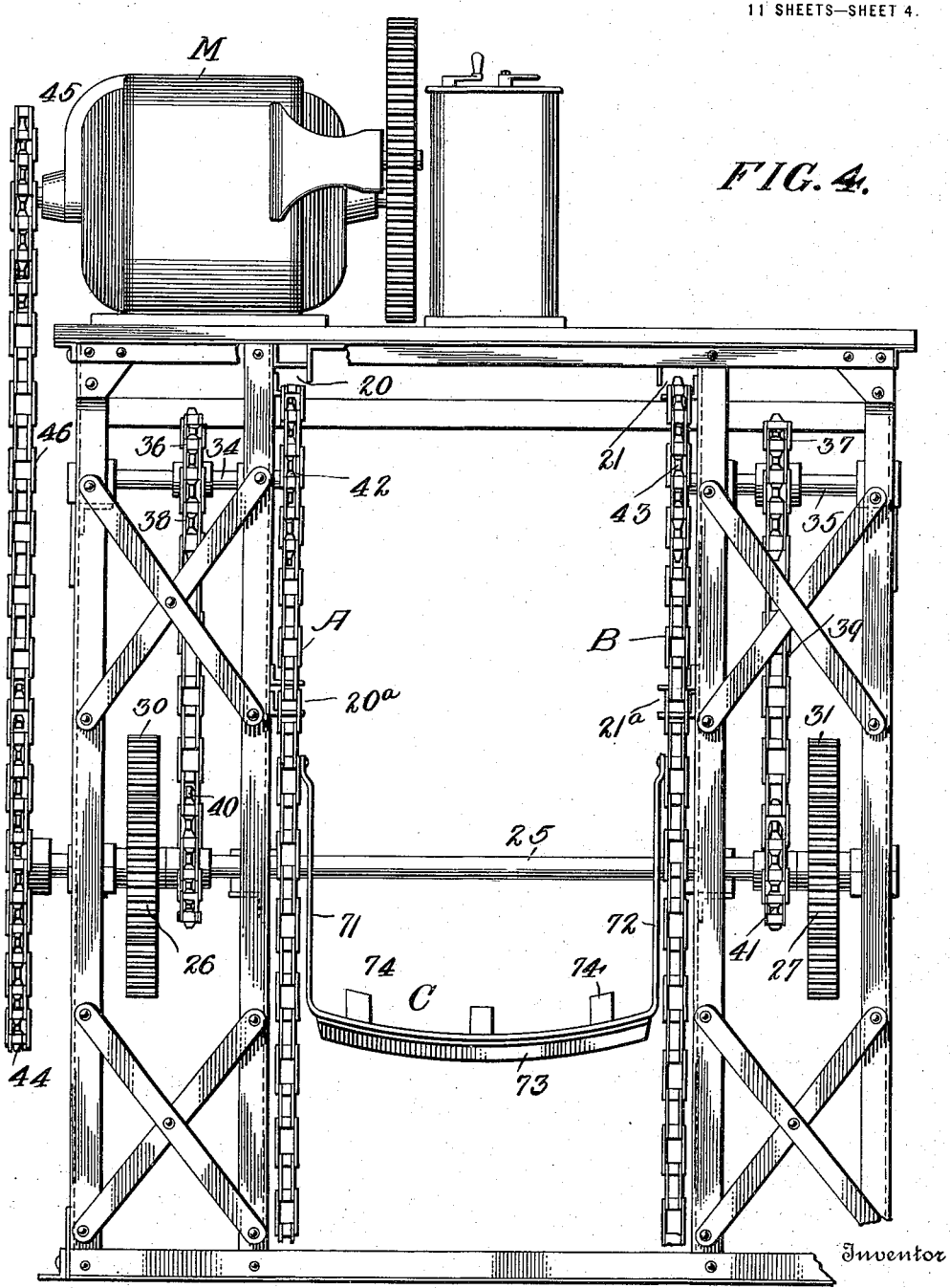
Figure 5:
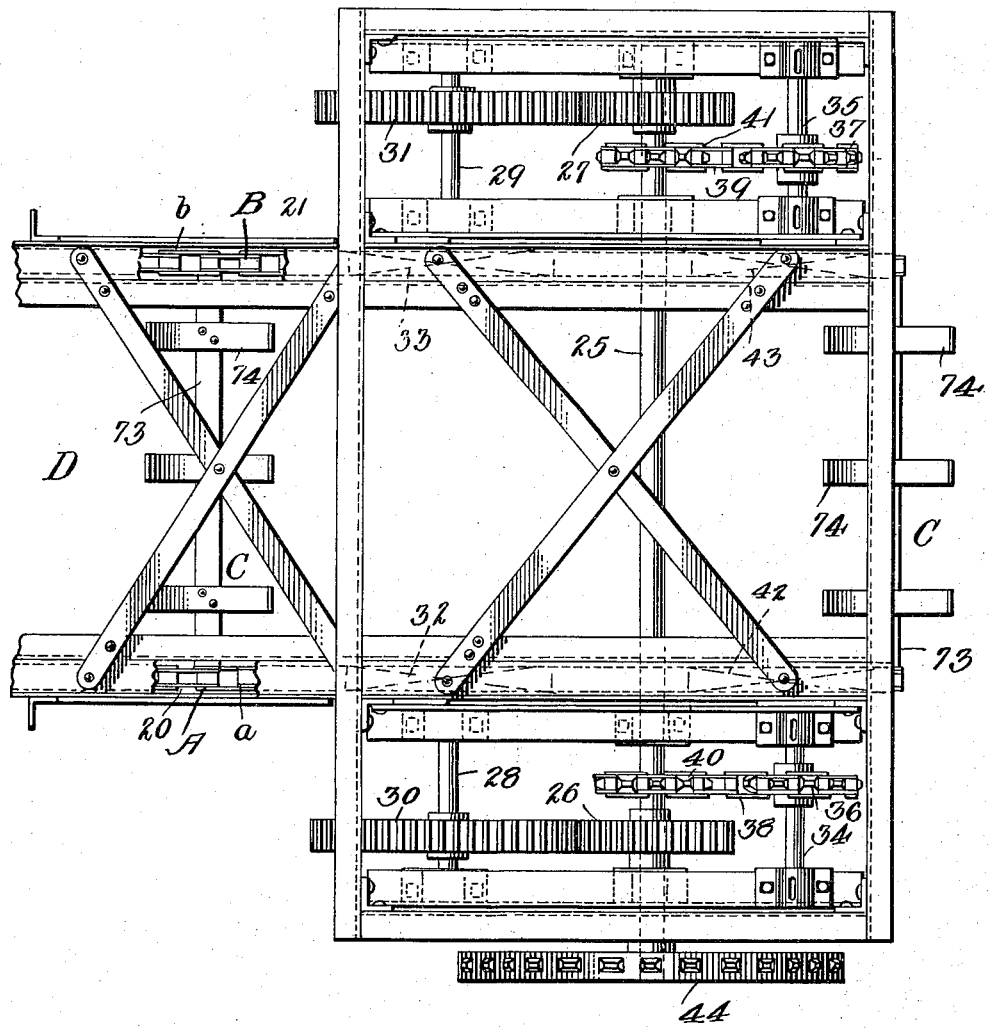
Figure 6:
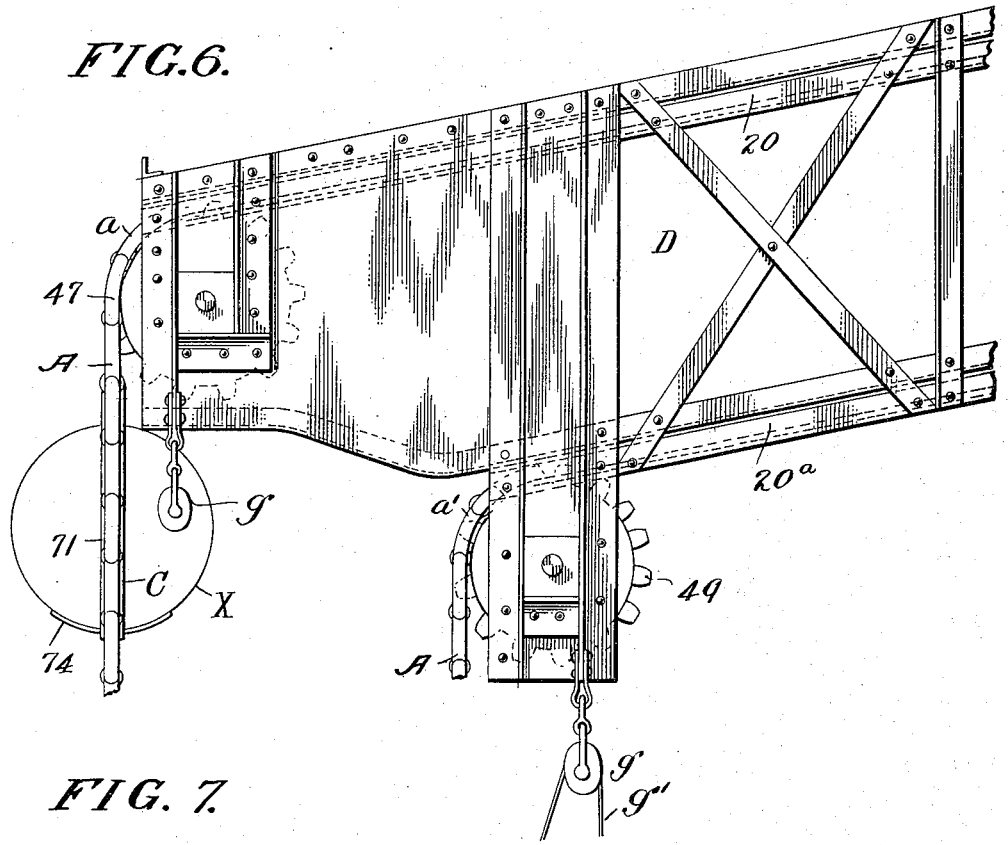
Figure 7:
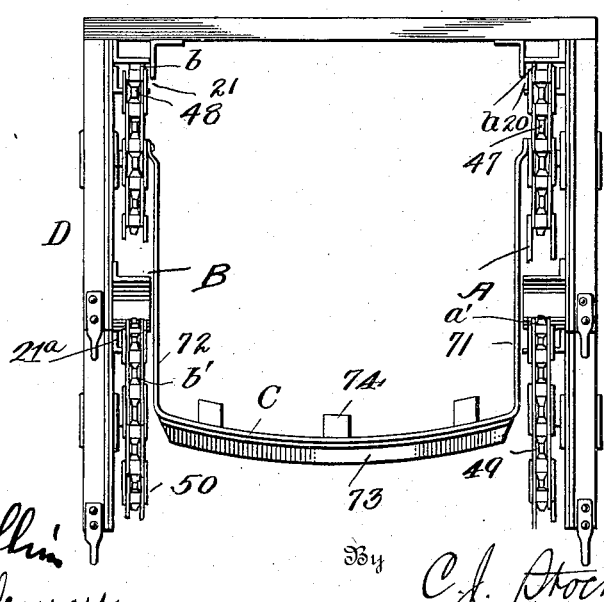
Figure 10:
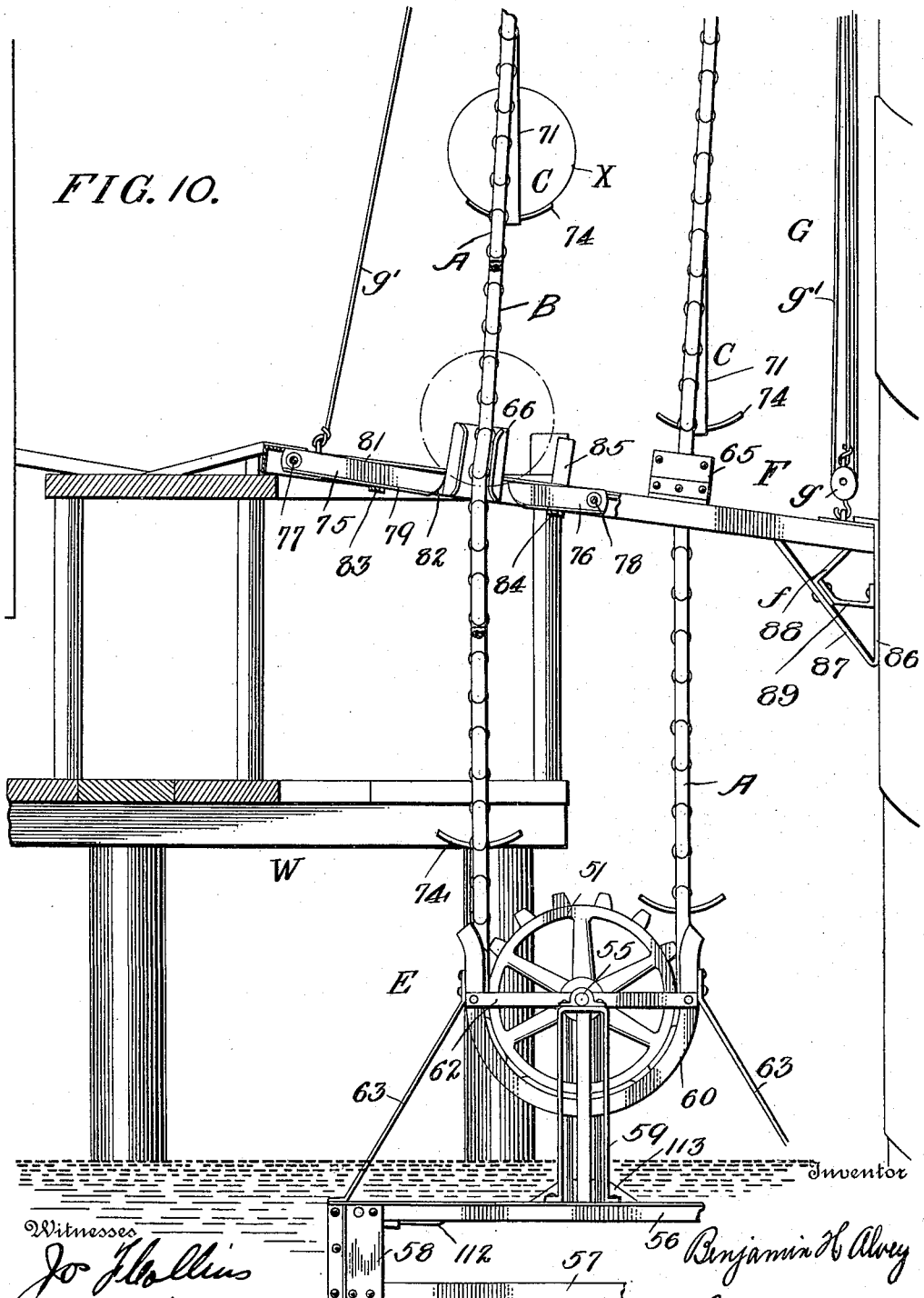
Figure 11:
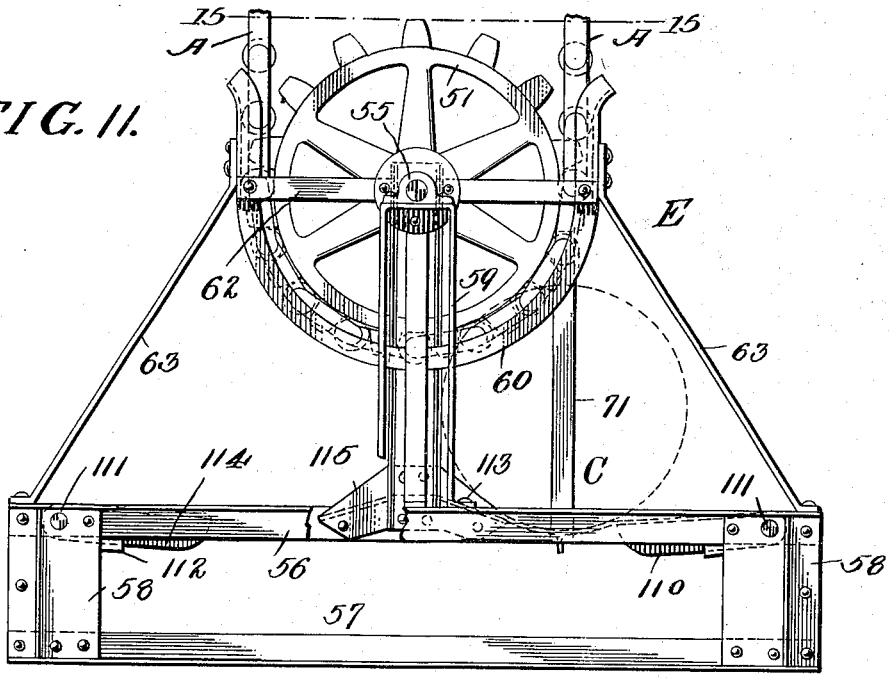
Figure 12:
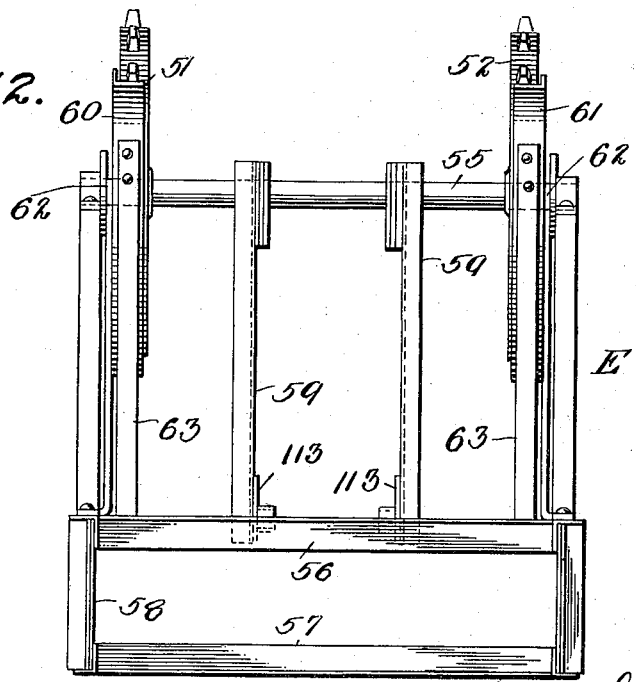
Figure 13:
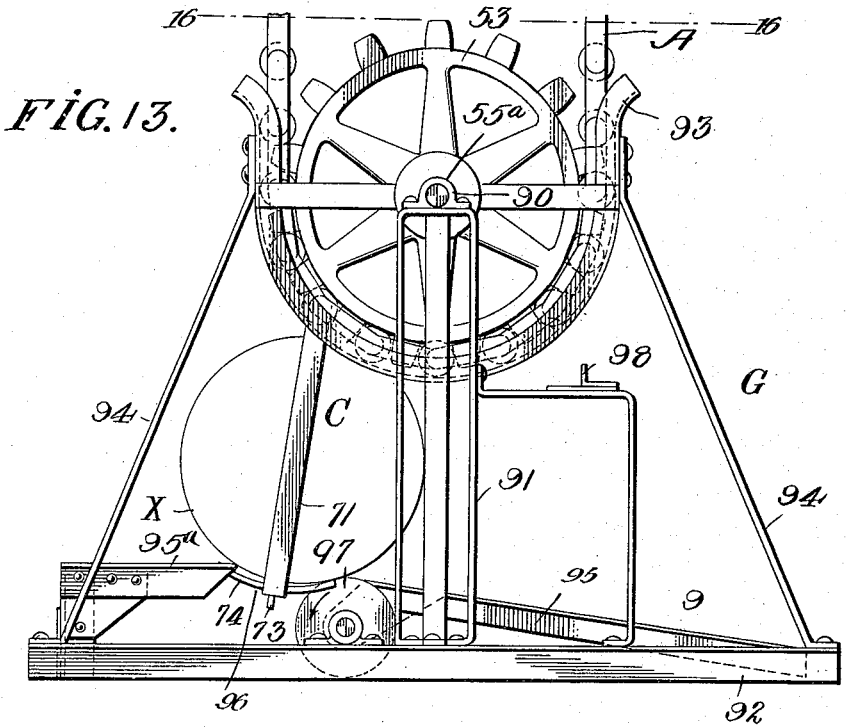
Figure 14:
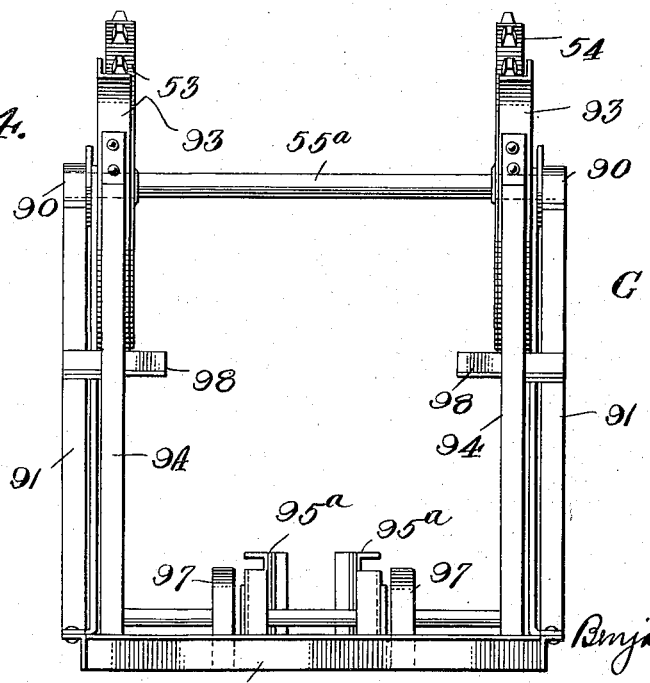

In the drawings: Figure 1 is a side elevation somewhat diagrammatically represented, of a system embodying the present improvements arranged for loading vessels from a dock. Fig. 2 is a like view of the system with the elements arranged for unloading vessels to a dock. Fig. 3 is a view on a larger scale showing in side elevation the endless traveling elements, the means for applying power thereto and the frame for supporting the same. Fig. 4 is an end elevation of the same parts. Fig. 5 is a plan view of the same end of the machine, with the motor omitted. Fig. 6 is a side elevation of the opposite end of the frame and the sprockets and chains thereat. Fig. 7 is an end view of this end of the frame and traveling elements. Fig. 8 is a plan view of the same. Fig. 9 is a plan view of the loading platform, showing also the carrier chains, said carrier-chains being represented in section. Fig. 10 is a detail representation of the receiving end of the machine when the latter is employed for loading vessels, the loading platform being shown as mounted on a dock and with one end thereof in section to disclose parts which otherwise would be concealed. Fig. 11 is a detail representation in side elevation with a part broken away, of the receiving or loading end of the machine, without the loading platform. Fig. 12 is a front elevation of the same parts. Fig. 13 is a detail representation, in side elevation of the unloading end of the machine. Fig. 14 is a front elevation of the same parts. Fig. 15 is a section on the line 15—15 of Fig. 11. Fig. 16 is a section on the line 16—16 of Fig. 13.

Similar characters of reference designate corresponding parts in the several views.

The present system comprises traveling package-conveying means, preferably composed of a pair of endless traveling chains A and B, of a suitable type, roller or otherwise as desired, spaced apart and provided with suitable carriers, as C, which are pivotally suspended therefrom so as to always hang in a vertical direction. This conveying means is guided to provide what may be referred to as three sections, marked 100, 200 and 300 respectively, in Figs. 1 and 2. The section 100 runs over the deck V' of the vessel V, from the hatchway V" to the rail or side thereof. The other sections depend from the ends of the section 100, one of the same extending into the hold, through said hatchway and the other running downward alongside the vessel and into proper position with respect to the dock W, or a barge, lighter or the like, from or to which the vessel is being loaded or unloaded. One of these depending sections is freely suspended, that is to say, it is free from any support from below. The section upon which the packages are deposited, for conveyance, hereinafter called the "receiving section", is marked 200, while the other, hereinafter termed the "discharging section", is marked 300. In Fig. 1 the receiving section is shown as being the one near the dock, and the discharging section is in the hold of the vessel, this figure showing the system arranged for loading vessels; while in Fig. 2 the receiving section is in the hold and the discharging section is operatively related to the dock, this figure showing the parts arranged for unloading vessels.

The intermediate section 100 is supported, preferably throughout its length, by a suitable frame, marked D, which is carried by the vessel. This frame is formed preferably of suitably arranged angle irons, or is otherwise suitably provided with means forming runways or channels 20, 20ª for the upper and lower runs $a$ and $a'$ respectively of the chain A and similar runways or channels 21, 21ª for the upper and lower runs $b$ and $b'$, respectively, of the chain B. It also is formed to provide support for the driving mechanism and certain elements of the chain-directing means.

The driving mechanism referred to is preferably located at the end of the frame adjacent to the hatchway and said frame is preferably arranged to incline downward from said end to its other end, which latter is arranged beyond the vertical plane of the side of the vessel, as shown in Figs. 1 and 2.

My experiments have disclosed the need among other things, of a correlation of parts which will prevent the piling up of the chains at either head and for causing both the working and returning runs of the chains to work smoothly and uniformly at all times. I have found that when the power is applied directly to one run of the chain only, whether this be the working run or the returning run, there is a very pronounced tendency for the chain to become slack or to pile up at one or the other head. I have also found that when the weight of the package being carried by the depending sections of the carrier is wholly at one side of the vertical plane of said sections, the chain becomes kinked by reason of this eccentric loading. It being obviously important that loaders of this character shall run smoothly and uniformly, without slack, kinking or piling up of the chain at either head, I have provided, among other things, a double-chain arrangement wherein the carriers are suspended between said chains, and, moreover, have provided a driving mechanism therefor which applies the power directly to both the upper and lower runs of both chains simultaneously, in opposite directions and at approximately the same speed. The driving mechanism which I have particularly devised will now be set forth in detail, but I would have it understood that changes in the illustrated details of the driving mechanism may be made without departing from the spirit of the invention or the scope of the subjoined claims, it being essential, however, as to this part of the invention—whether the traveler consist of a single chain or two chains with carriers suspended between them, the latter being preferred—that the power shall be applied directly to both the working and returning runs of the traveler, simultaneously, in reverse directions and at approximately the same speed, by means of separate gears which respectively engage the working and returning runs of the traveler and are driven from a common shaft through the intervention of separate appropriate gearings.

Referring now to the particular driving mechanism illustrated I provide for the lower runs $a'$ and $b'$ of the chains A and B a pair of sprockets 32 and 33 which respectively engage said runs, and for the upper runs $a$ and $b$ of the chains I provide a similar pair of sprockets 42 and 43. These sprockets are preferably arranged at the upper ends of the depending sections of the chains. The sprockets 32 and 33 are fixed to separate stub shafts 28 and 29 and the sprockets 42 and 43 similarly are fixed to separate stub shafts 34 and 35 respectively. 25 designates a common driving shaft. This shaft 25 extends across the frame of the conveyer and is provided with a pair of gears 26 and 27 which are fixed to it and are directly intermeshed with gears 30 and 31 respectively fixed to the stub shafts 28 and 29, whereby movement is imparted to the latter shafts, and consequently to the sprocket wheels 32 and 33 and lower runs $a'$ and $b'$, in a direction the reverse of that of the driving shaft 25. The means for transmitting movement from the shaft 25 to the stub shafts 34 and 35, which carry the sprockets 42 and 43, comprise a pair of gears 40 and 41 fixed to the shaft 25, sprockets 36 and 37 fixed to the stub shafts 34 and 35 and chains 30 and 31 respectively connecting the sprocket 36 to the sprocket 40 and the sprocket 37 to the sprocket 41, whereby the stub shafts 34 and 35, and consequently the gears 42 and 43 and the upper runs $a$ and $b$ of the traveling chains, are driven from the shaft 25 and in the same direction as the latter. The gears are so proportioned that the speed imparted to the returning runs of the traveler is approximately the same as the speed imparted to the working runs of the latter. The illustrated means for driving the shaft 25 comprises an electric motor M, sprockets 44 and 45 and chain 46.

At the other end of the frame D are suitably supported idler sprockets 47 and 48 for engaging the upper runs $a$ and $b$ of the chains and similar idler sprockets 49 and 50 for engaging the lower runs $a'$ and $b'$ of said chains. These idler sprockets direct the motion of the chains at the junctions of the receiving sections 200, or 300, and the section 100.

51 and 52 designate idler sprockets which engage the chains A and B, respectively, of the receiving section 200 and direct the motion of the same from their working to their returning runs: and 53 and 54 designate idler sprockets which engage said chains of the discharging section 300 and similarly direct the motion of the same from their working to their returning runs.

Assuming that the system is being used for loading vessels, as shown in Fig. 1, it will be apparent that the working run of the endless traveling means, passes from the sprockets 51 and 52, in an upward direction, and travels in front of the dock W where the carriers C as they successively rise receive their loads X and that this working run thence travels over the sprockets 47 and 48, along the channels or runways 20 and 21 over the sprockets 42 and 43 to which power is applied as hereinbefore stated, thence downward through the hatchway and into the hold of the vessel and around the sprockets 53 and 54, adjacent to which the load is discharged from each carrier, thence returning to the sprockets 51 and 52, by traveling upward within the hold, over the sprockets 32 and 33, which, as already stated, form driving sprockets for the lower runs of the chains, being positively driven from the motor, thence along the lower runways or channels 20$^a$ and 21$^a$ and over the sprockets 49 and 50 and down to the sprockets 51 and 52, thus completing the circuit.

When the system is arranged for unloading vessels, the sections 200 and 300 are transposed, the receiving section 200 being placed in the hold of the vessel and the discharging section 300 in suitable operative relation with the dock, barge, lighter or other thing which receives the load from the vessel, as shown in Fig. 2. This transposition may be effected by disconnecting appropriate links of the chains from each other and reconnecting the links with each of said sections in the place formerly occupied by the other, for example. This arrangement is shown in Fig. 2, upon reference to which it will be seen that the travel of the chains is precisely as before, but, obviously, the correlation of parts may be such, if considered expedient, that the direction of travel of the chains when unloading a vessel will be the reverse of their travel when loading a vessel. This does not essentially require any special change in the apparatus, as the mechanism employed is or may be capable of operating in either direction, and at the most need only call under certain circumstances for a turning of the loading and unloading platforms from the positions in which they are shown.

The relative position of the vessel and the dock, barge, lighter, or the like, is constantly changing, due in large part to waves, tides, and variation in the load. It is therefore, essential to a most highly practical construction of loader or unloader that the elements automatically so accommodate themselves to the various relative positions of the vessel and the dock, barge, or lighter, that their operative relations will not be destroyed by any movements of the vessel or of the dock, barge or lighter, or of both the vessel and the part from or to which it is being loaded or unloaded. It will be noted in this connection that the receiving section 200 is freely suspended, and hence is free to rise and fall with the vessel. It also has means whereby it is maintained under tension and means whereby it is maintained in approximately parallel position with the side of the vessel. The discharging section 300 may also be freely suspended if desired. The means devised by me for accomplishing these purposes, and preferably employed, which means also include important loading and unloading features or elements will now be set forth.

E designates a frame adapted to support the shaft 55 which carries the sprockets 51 and 52 and serves to add to the weight imposed on the chains by said sprockets and their shaft. This frame may be of any suitable construction, but it preferably is formed of upper and lower open frames 56 and 57 spaced apart and connected with each other by strips or plates 58 at the corners, and provided with standards 59 which support the bearings for the shaft 55. Suitably supported grooved guides 60 and 61 for the chains A and B are also preferably mounted on this frame E around the lower circumferential portions of the sprockets 51 and 52, for maintaining the chains in engagement with the teeth of the sprockets. These guides are preferably carried by arms 62 from the standard 59 and are braced by arms or rods 63, extending diagonally in opposite directions therefrom to the frame E. As shown most clearly in Fig. 12, the guides are preferably formed of angle irons. Above this frame is a loading platform F. In the herein exemplified form of the invention, this platform is shown as mounted upon a dock W having an elevated platform which extends longitudinally thereof and has its top on a level with the doors of cars, marked Y, so as to permit the transshipment of packages directly from the cars to the vessel.

The floor of the dock and the top of its platform are shown in Fig. 10, as cut away adjacent to the platform F to permit the section 200 of the conveyer to pass therethrough toward or into the water: but, if desired, said section may be arranged in front of the edge of the dock, as shown in Fig. 1. This platform F is free to be moved back and forth and laterally on the dock, barge, lighter or other support therefor, from which the vessel is being loaded and it extends over the edge of its said support and to the side of the vessel. It consists of an open frame, or is otherwise formed to provide passages, through which the traveling elements of the conveyer move, said frame having means for supporting the packages in the path of the carriers C, so related to the latter as to permit the packages to be picked up by the carriers, and also having means for restricting relative movements of the traveling elements of the conveyer and platform in directions and to an extent which would destroy the operative relation of the parts, or cause rupture or breakage. The form herein exemplified is provided with guides 64 and 65 for the chain A and with other guides 66 and 67 for the chain B, these guides being so related to the chains as to restrict relative movement between the chains and the platform in the direction of the length of the latter, while the sides of said platform will similarly restrict relative movement between the chains and the platform in a direction transverse of the latter to within safe limits.

The carriers C are, as shown best in Fig. 4, preferably each of the type comprising a pair of side arms 71 and 72 whose upper ends are pivotally connected to the chains A and B, respectively, and whose lower ends are connected by a cross bar 73 from which a series of fingers 74, of size, shape and strength adapted to support the packages to be conveyed, project in opposite directions. This construction among others of its advantages avoids eccentric loading of the chains and consequent kinking of the same. The means of the platform F preferred for supporting the packages in the path of these carriers, shown best in Figs. 9 and 10, comprise a plurality of arms 75 and a second plurality of arms 76, arranged on opposite sides of the path of travel of the bar 73 carried by the rising run of the chains A and B. The arms project toward the arms 76 and said arms are preferably arranged in positions to alternate with the fingers 74. Thus, they do not interfere with the free movement of the traveling elements of the conveyer, and packages placed on them and supported partly by one set of arms 75 and partly by the other set of arms 76 are picked up by said fingers 74.

The arms 75 and 76 are preferably mounted so as to incline downward and to be yieldable upward. In the exemplified embodiment of the invention, the arms 75 have their outer ends pivotally mounted on a cross shaft 77 and the arms 76 have their outer ends similarly pivotally mounted on a cross shaft 78. If from any cause an upward strain is imposed on these arms while a package is on the same they will yield thereto and if a rising carrier be contiguous to them at this time they will still be capable of depositing the package on the latter. They are preferably returned by gravity, but springs or other suitable means may be used for this purpose, if desired. Each of these arms is preferably made of angle iron with a base flange 79, cut away near its free end or front, as shown at 80 and with the free ends of its package-engaging member 81 formed with an outwardly beveled under edge 82. Transverse supporting bars 83 and 84 are arranged to engage the arms near their free ends and support them against downward movement. Suitably supported stops 85 are employed to define the position of the packages on the arms, and are particularly useful when the package is of a nature which is rolled upon the arms, barrels for example, serving to restrict their inward movement to within a safe limit. These stops are herein shown as supported by the cross bar 84. The chain guides 64, 65, 66 and 67 preferably have their walls beveled, as shown best in Fig. 10, to provide expanded inlets and outlets and to guide the chain to its proper position between the same.

The platform is provided with a suitable tackle whose blocks or pulleys are marked $g$ and whose ropes are marked $g'$, by which it may be raised and lowered from and to its place, and adjusted as hereinafter more fully explained.

From the foregoing it will be apparent that as the section 200 of the conveyer is free from attachment to the dock, it is free to follow the rising and falling movements of the vessel and to sink deeper into or rise above the water, and that as it is also free from attachment to the loading platform F the position of the latter is not varied by the rising and falling movements of said section 200 and remains at a height convenient for the stevedore to place thereon the package which is to be delivered by it to a carrier C. Again, it will be noted that the platform is free to move laterally and back and forth with said section 200. Again, any back and forth and lateral movements of the loading platform beyond predetermined limits are communicated to the section 200. Thus, proper operative relation of the loading platform and the section 200 is normally maintained, but should these parts assume a relative position which causes binding of the chain on the platform and lifting of the latter, this may be corrected by adjusting the platform to its proper position, by means of the tackle hereinbefore referred to. Its engagement with the vessel's side is preferably of a nature which will act to brace the platform against downward movement under the weight of the package imposed thereon. To this end it is preferably provided with a suitable number of depending brackets $f$, each here shown as having a member 86 of such length and so positioned as to provide an effective bearing against the side of the vessel, and braced by an inclined member 87 and other members 88 and 89 between the members 86 and 87.

The delivering section 300 of the conveyer may be either fixed against rising and falling movements relatively to the vessel or freely suspended to have such movement. It preferably, however, is free from support from below, as shown in Fig. 1, whereby it will hang vertically at all times, regardless of listing and other movements of the vessel. Its sprockets 53 and 54 are fixed on a shaft $55^a$ which has its journals in bearings 90 which in the herein exemplified form of the invention are carried by standards 91 rising from a base 92. This base, if the discharging section be freely suspended forms a weight which will assist the weight of the sprockets and shaft in taking up slack in this section of the conveyer. Otherwise, it forms a convenient device to rest upon and support the sprockets from a suitable support, as the floor of the hold of a vessel or dock, or the deck of a barge or lighter, for example. Arcal guides 93 for the chains, are preferably provided adjacent to the sprockets. Those shown are similar to the guides marked 60 and 61, of the frame E and hence they need no further description. They are shown as supported from the base 92 by diagonal members 94.

Associated with the delivering section 300 is an unloading platform which may be and preferably is, as herein shown, carried by or formed in part of the frame which supports the sprockets 53 and 54. This unloading platform is provided with means which are arranged below such sprockets in such position that the descending carriers as they successively approach the delivering station are tilted to deposit the packages onto a suitable receiver. In the herein exemplified form, the receiver referred to is a runway or skid formed of separate spaced inclined bars 95, but any suitable construction or form of skid or gravity conveyer, or other suitable means for receiving the packages from the delivering leg may be employed. Rearward of the bars 95 are other bars $95^a$. A space, marked 96, is left between the ends of the bars 95 and $95^a$, and the carriers C travel into said space. The illustrated means for tilting said carriers comprise idler rollers 97 which preferably are loosely mounted on a shaft and are arranged in such position that when a loaded carrier reaches the same, its lower end will be caused to move backward until its fingers 74 have assumed an inclined position adapted to permit the package to roll or slide therefrom onto the receiver 95 which latter, in the form herein shown is adapted to convey the package off. The rollers 97, shown in the drawings are arranged to be engaged by the barrel X before the carriers C have reached the lowest point of the sprockets 53 and 54. Continued downward movement of the carrier and barrel causes said rollers 97 to rotate in the direction of the arrow Fig. 13 and by their rotative movement they tend to force the barrel rearward. Meanwhile, however, the carrier has not been wholly freed from the weight of the barrel and as its upper end continues to move downward and forward around the sprocket, it follows that the carrier is tilted rearward from its upper end until the barrel is deposited on the bars $95^a$ and the rollers 97. The bars $95^a$ being in a plane higher than the plane of the upper surfaces of the rollers 97, as shown in Fig. 13, the barrel, when it reaches the position where it is engaged therewith, is free to roll by gravity onto the skid 95 by which it is quickly carried off out of the path of the carriers C. These carriers C when freed from the barrel are caused to move toward the front, behind the barrel, or other package which they have discharged along the skid 95 until their arms 72 strike obstructions or buffers 98 which straighten them out for their upward passage, with the chain in a vertically pendant position. It will be noted that this discharging platform permits the discharge of the package at the lower extremity of the delivering section, below the sprockets of said section, and effects such discharge automatically and with absolute certainty.

When the system is arranged for unloading vessels it may be possible in some cases to use the loading platform F but it is desirable to provide a means which will deliver the packages to the carrier C, other than the loading platform referred to, to be used in lieu of the latter. This means is preferably carried by and forms a part of the frame E, hereinbefore described. As shown best in Figs. 11 and 15 the frame or platform E is provided with a set of arms, marked 110, corresponding in construction and function with the arms 75 of the platform F, preferably being, as herein shown, made of angle iron and pivotally mounted upon a shaft 111, or otherwise suitably supported to yield upward, and resting upon a transverse support 112. Associated with these arms are other arms, 113, which are herein shown as fixed. The barrel or other package to be transported is placed upon the arms 110, 110, 113, 113, and is picked up therefrom by the carrier C, whose cross member 73 travels in the space between the front ends of the arms 110 and 113 and whose fingers 74 are in such position that they alternate with the arms 110 and 113 when they are contiguous thereto. In order to adapt this platform to operate with either of its ends presented to the ascending runs of the conveying elements it is preferably provided with a like set of pivoted arms, marked 114, and fixed arms, marked 115, at the opposite side of its transverse support from that upon which the arms first mentioned are arranged. As here shown the arms 113 and 115 have downwardly beveled upper faces and are secured to the standard 59.

The loading and unloading operation of the conveyer will it is thought be fully understood and its manifold advantages and complete practicability as a ship-loader and unloader fully comprehended without further description. When the conveyer is not in use it may be stored, either upon the dock or upon the vessel in a compact space by lifting its sections 200 and 300 and turning them down on the frame D, or otherwise disposing of them, where they will be out of the way. The frame D is preferably, though not essentially of a portable nature.

Having now described the invention what I believe to be new and desire to secure by Letters Patent, is:

1. In a conveyer, the combination of a frame having upper and lower tracks at each side, an endless traveler engaging the upper and lower tracks at one side throughout a part of its length, a second endless traveler engaging the upper and lower tracks at the other side of the frame, said travelers being of length greater than the frame and having their end portions depending from the ends of the latter, package carriers arranged between the travelers and suspended from the latter, the said carriers being pivotally connected at their upper ends with the travelers and having their lower ends provided with package-carrying portions which project forward and rearward from the plane of the travelers, means whereby the endless travelers at one end of the conveyer are weighted to take up slack therein, the latter ends of the travelers being unsupported, and means connected to the frame and engaging the travelers and imparting movement to the latter, comprising separate driving gears respectively engaging the working and returning runs of the travelers, a common power shaft and separate gearings between the power shaft and the driving gears arranged to drive the latter simultaneously in directions one the reverse of the other and at substantially the same speed.

2. In a conveyer, the combination of a frame having upper and lower tracks at each side, an endless traveler engaging the upper and lower tracks at one side throughout a part of its length, a second endless traveler engaging the upper and lower tracks at the other side of the frame, said travelers being of length greater than the frame and having their end portions depending from the ends of the latter, package carriers arranged between the travelers and suspended from the latter, the said carriers being pivotally connected at their upper ends with the travelers and having their lower ends provided with package-carrying portions which project forward and rearward from the plane of the travelers, means whereby the endless travelers at one end of the conveyer are weighted to take up slack therein, the latter ends of the travelers being unsupported, and means connected to the frame and engaging the travelers and imparting movement to the latter, comprising a common power shaft having a plurality of gears, gears engaging one run of the travelers, other gears movable in the same direction as the latter gears, and respectively intermeshed with certain of the gears on the power shaft, gears engaging the other runs of the travelers, gears movable with and in the same direction as the last mentioned gears and having an intermediate driving connection to the remaining gears on the power shaft, the several gears being proportioned and thus arranged to drive the working and returning runs of the travelers simultaneously and at the same speed in directions one the reverse of the other.

3. A ship loader or unloader comprising an endless traveling conveyer guided to provide an intermediate section and sections depending from the ends thereof, said conveyer having pivotally-suspended package-carriers, a loading device supported in operative relation with one of said end sections, said loading device being provided with means for supporting packages in the path of the package-carriers and arranged to be moved on its support with swinging movement of said section, the latter having traveling movement relatively to said device and extending below said device and being freely suspended.

4. In a ship loader or unloader, the combination with an endless traveling conveying means provided with pivotally suspended package carriers, said conveying means having a suspended section, of a movably-supported platform arranged above the lower end of the suspended section and having package-supporting elements operatively related to the package carriers, the platform having means through which the suspended section travels to a place below the package-supporting elements of the platform and which means guides the suspended section.

5. In a ship loader or unloader, the combination with an endless traveling conveying means provided with pivotally suspended package carriers, said conveying means having a suspended section, of a movably-supported platform arranged above the lower end of the suspended section and having package-supporting elements operatively related to the package carriers, the platform having means through which the suspended section travels to a place below the package-supporting elements of the platform and which means guides the suspended section, and said suspended section having means separate from the platform and below the latter for weighting it.

6. In a conveyer, a carrier, endless traveling means supporting the same and subject to swinging movement, and means for depositing packages on the carrier, mounted for movement bodily on its support and having spaces through which the endless means and the carrier are free to travel and parts in the path of swinging movement of the endless means for causing it to be moved bodily thereby.

7. A ship loader or unloader, comprising a traveling conveying means having a suspended section, and a means through which the same travels, having elements in the path of swinging movements thereof and package supporting elements operatively related thereto, the latter means being free to move on its support and having elements for supporting a package in the path of travel of the conveying means.

8. A ship loader or unloader, comprising a traveling conveying means having a suspended section, and a means through which the same travels, having guiding elements therefor and package supporting elements operatively related thereto said means being adapted to be supported by the dock, barge, lighter or the like, from or to which the ship is being loaded or unloaded, and being free to move on such support with the swinging movements of the ship.

9. A movably supported loading platform for ship loaders, comprising a frame, two sets of pivotally supported arms projecting toward each other from opposite sides of the frame and guiding elements at the ends of the frame, combined with a conveyer comprising endless traveling side members guided to provide a suspended section whose sides travel through the guides on the movable frame and carriers pivotally supported by and arranged between the side members of the conveyer, said carrier having spaced package-supporting fingers which extend in opposite directions therefrom and pass between the arms of the loading table.

10. In a ship loader, the combination of a movably supported loading platform and a traveling conveyer having endless traveling members and package-carriers provided with spaced fingers, the movable platform comprising a frame having channels through which the endless members of the conveyer travel and also having arms for supporting the packages in the path of the carriers, whereby the conveyer is movable relatively to the platform and the platform partakes of swinging movement of the conveyer.

11. The combination with an endless traveling means, having carriers provided with side members pivotally suspended from the endless means and spaced package-supporting fingers extending forwardly and rearwardly from the lower ends of said side members, of a platform having sets of spaced arms which are arranged below the endless means and through which the fingers of the carriers travel while passing from their descending to their ascending course, the arrangement of the arms below the endless means being at a distance from the latter less than the length of the pivotally suspended side members of the carriers.

12. The combination with an endless traveling means comprising spaced side chains and carriers arranged between said chains and comprising side arms whose upper ends are pivoted to said chains and whose lower ends are connected with each other and provided with spaced package-supporting fingers extending forwardly and rearwardly therefrom, of a platform provided with wheels around which the endless chains of the conveyer pass, said platform also having sets of spaced arms which are arranged below said wheels and through which the fingers of the carriers travel while passing around said wheels, the arrangement of the arms below the wheels being at a distance from the latter less than the length of the side arms of the carrier.

13. The combination with a loading frame, wheels supported thereby and spaced apart, sets of spaced arms supported by said frame and arranged below said wheels and conjointly serving to support packages, and arcal guides supported by said frame and spaced apart and extending around the lower circumferential portions of the wheels, of a pair of endless travelers which respectively extend around said wheels and within said guides, and carriers supported by said travelers and arranged between the same, each of said carriers comprising side arms whose upper ends are pivoted to the travelers and whose lower ends are connected with each other and provided with package-carrying fingers which extend in opposite directions, the arrangement of the arms below the wheels being at a distance from the latter less than the length of the side arms of the carriers, and said carriers while passing around the wheels traveling between the arcal guides and within the spaces between said arms.

14. In combination with an endless traveling package-conveying means, having suspended carriers provided with spaced package-supporting fingers, a loading platform having standards, wheels borne thereby and arranged at the end of the receiving section of the endless means and engaging the same, spaced package-supporting elements extending in opposite directions from the standards, and spaced package-supporting arms extending toward said elements from the ends of the frame, said arms and elements being arranged below the wheels and coöperating to deliver the packages to the carriers.

15. In combination with an endless traveling package-conveying means, having suspended carriers provided with spaced package-supporting fingers, a loading platform having standards, wheels borne thereby and arranged at the end of the receiving section of the endless means and engaging the same, spaced package-supporting elements extending in opposite directions from the standards, and spaced package-supporting arms extending toward said elements from the ends of the frame, said arms and elements being arranged below the wheels and coöperating to deliver the packages to the carriers, said arms being pivoted to yield in the direction of travel of the carriers.

16. In a conveyer, a carrier, endless traveling means from which the carrier is pivotally suspended, the carrier having spaced package-supporting fingers extending in opposite directions from a place below its pivots, and means arranged below the endless means and in the path of the fingers for causing the carrier to tilt on said pivots and discharge its load in its travel thereby.

17. In a conveyer, a carrier, endless traveling means from which the carrier is pivotally suspended, the carrier having spaced package-supporting fingers extending in opposite directions from a place below its pivots, means for tilting the carrier on said pivots, arranged below the endless means and in the path of the fingers, and a receiver comprising spaced bars arranged approximately in the plane of said fingers when the carrier is tilted, so as to receive the package therefrom without shock.

18. In a conveyer, a receiver having package receiving elements one of which is arranged rearward of the other with a space between them, in combination with an endless traveling means arranged above the package-receiving elements and having pivotally suspended carriers which travel in the space between said package-receiving elements while passing from their descending to their ascending course, and means arranged adjacent to said space and in the path of said carriers for tilting them while they are passing from their descending course to their ascending course.

19. In a conveyer, an inclined package-receiver, comprising two members arranged one in advance of the other with a space between them, one of said members being in a higher plane than the other, in combination with an endless traveler arranged above the package receiver carriers provided with arms whose upper ends are pivoted to said traveler and whose lower ends are provided with spaced package-supporting fingers projecting forward and rearward therefrom, the distance between the receiver and the lower end of the endless traveling means being less than the length of said arms and the space between said members of the receiver being arranged to receive the arms of the carriers when the latter are at their lower limit of travel the receiver being provided with openings through which the carrier-fingers can travel, and means arranged adjacent to said space and in the path of travel of said carriers for tilting them when they are in said space.

20. In a conveyer, a wheel, a receiver having package-receiving members arranged below said wheel and one in advance of the other with a space between them, in combination with an endless traveler which passes around said wheel, carriers provided with arms whose upper ends are pivoted to said traveler and whose lower ends are provided with spaced package-supporting fingers which project forward and rearward therefrom, the distance between the package-receiving members and the wheel being less than the length of the arms of the carriers and the space between said members being arranged to receive the arms of the carriers while the latter are traveling around the lower circumferential portion of the wheel, the receiver having openings through which the carrier fingers can travel, and means arranged adjacent to said space and in the path of travel of said carriers for tilting them when they are in said space.

21. In a conveyer, an endless traveling means, a carrier pivotally suspended therefrom, a receiver having elements arranged below the endless means, said elements having a space between their confronting ends into which the carrier travels, and rotative means mounted in said space, the parts being so correlated that the carrier will be tilted and its load deposited on the receiver while the carrier is traveling from the working to the returning side of the conveyer.

22. In a conveyer, an endless traveling means, a carrier pivotally suspended therefrom and provided with spaced package-carrying fingers, spaced inclined bars arranged below the endless traveling means, bars arranged rearward of the inclined bars and spaced from the ends of the latter, the parts so arranged that the carrier will travel into the space between the ends of the inclined and rearward bars, and means for inclining the lower end of the carrier toward the rearward bars and causing the discharge of the load onto the bars.

23. In a conveyer, an endless traveling means, a carrier pivotally suspended therefrom and provided with spaced package-carrying fingers, spaced inclined bars arranged below the endless traveling means, bars arranged rearward of the inclined bars and spaced from the ends of the latter, the parts so arranged that the carrier will travel into the space between the ends of the inclined and rearward bars, spaced wheels mounted in the space between said inclined and rearward bars and adapted to cause the lower end of the package carrier to move rearward and engage the package with the rearward bars and discharge the same upon the inclined bars.

24. In a conveyer, an endless traveling means, a carrier pivotally suspended therefrom and provided with spaced package-carrying fingers, spaced inclined bars arranged below the endless traveling means, bars arranged rearward of the inclined bars and spaced from the ends of the latter, the parts so arranged that the carrier will travel into the space between the ends of the inclined and rearward bars, spaced wheels mounted in the space between said inclined and rearward bars and adapted to cause the lower end of the package carrier to move rearward and engage the package with the rearward bars and discharge the same upon the inclined bars, said inclined bars being disposed in the path of travel of the carrier from the working to the returning side of the conveyer, and means adjacent to said returning side for causing the carrier to resume its vertical position.

25. In a conveyer, an endless traveling means, a carrier pivotally suspended therefrom, a receiver arranged below the endless traveling means and adapted to convey packages off therefrom, means for tilting the carrier to cause the discharge of its load upon the receiver when the upper end of said carrier reaches a position slightly in advance of its lowermost position of travel, said receiver being arranged in the path of travel of the carrier when the latter is inclined, and a stop for causing the carrier to resume its perpendicular position adjacent to the returning side of the conveyer.

26. In a conveyer, an endless traveling means, a carrier pivotally suspended therefrom and having spaced package-supporting fingers, a frame, wheels borne by the frame and engaging the endless means, forward and rearward spaced bars mounted on the frame below said wheels, the forward bars being spaced from the rearward bars and the space being so located that the carrier will travel thereinto, and means for inclining the carrier to cause the package to be discharged upon the bars when the carrier reaches said space.

27. In a conveyer, an endless traveling means, a carrier pivotally suspended therefrom and having spaced package-supporting fingers, a frame, wheels borne by the frame and engaging the endless means, forward and rearward spaced bars mounted on the frame below said wheels, the forward bars being spaced from the rearward bars and the space being so located that the carrier will travel thereinto, and means for inclining the carrier to cause the package to be discharged upon the bars when the carrier reaches said space, the forward bars inclined to carry the package off.

28. An unloading platform for conveyers having spaced forward bars and spaced rearward bars spaced from the forward bars, and a carrier tilting means arranged adjacent to the space between the forward and rearward bars, in combination with an endless traveling conveyer having package carriers provided with arms whose upper ends are pivoted to the conveyer and whose lower ends are provided with sets of forwardly and rearwardly projecting fingers arranged to travel between the bars of the receiver, said carriers being also arranged to travel in the space between said bars and having their arms of a length less than the distance of the carrier-tilting means from the lower end of the conveyer, the carrier-tilting means being arranged to engage the carriers while the latter are passing from their descending to their ascending course of travel.

29. In a conveyer, a carrier having spaced package-supporting fingers extending in opposite directions, endless traveling means supporting the same, and subject to swinging motion, a loading platform through which said traveling means and carrier are free to travel, said platform being free to be moved bodily by movement of the traveling means beyond predetermined limits, and having package-supporting arms alternating with the fingers of the carrier, on each side of the carrier, and yieldable pivotally in the direction of travel of the fingers.

30. In a ship loader or unloader, a conveying means carried by the ship and having a section for extending over the side of the same, and a platform slidably supported on a dock, barge, lighter or the like and having an end engaged with the side of the ship, said platform having means through which the depending section extends and parts in the path of swinging movement of said section, and said section having traveling movement through the platform.

31. In a ship loader or unloader, a conveying means adapted to be carried by the ship and having a depending section for extending over the side of the same, an approximately horizontal slidably mounted frame having an end for engagement with the side of the ship, said frame intersecting the path of travel of said section and said section and frame having parts in the path of relative swinging movement thereof, the section being free to travel relatively to the frame in package-feeding direction.

In testimony whereof I have hereunto set my hand in presence of two subscribing witnesses.

BENJAMIN H. ALVEY.

Witnesses:
W. H. ROBERTSON,
S. M. DUVALL.

Copies of this patent may be obtained for five cents each, by addressing the "Commissioner of Patents, Washington, D. C."